(12) United States Patent
Kato et al.

(10) Patent No.: US 6,829,747 B1
(45) Date of Patent: Dec. 7, 2004

(54) EDITING APPARATUS AND EDITING METHOD

(75) Inventors: Fumihiko Kato, Kanagawa (JP); Hitoshi Iijima, Kanagawa (JP); Yoshimichi Minakata, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/526,122

(22) Filed: Mar. 15, 2000

(30) Foreign Application Priority Data

Mar. 23, 1999 (JP) ............................................ 11-077572

(51) Int. Cl.⁷ .......................... G06F 15/00; G06F 17/00
(52) U.S. Cl. ...................................................... 715/530
(58) Field of Search ............................ 715/530, 501.1; 700/94; 369/25.01, 29.02, 30.08, 30.09

(56) References Cited

U.S. PATENT DOCUMENTS

| | | | | |
|---|---|---|---|---|
| 5,237,682 A | * | 8/1993 | Bendert et al. | ............. 707/205 |
| 5,544,360 A | * | 8/1996 | Lewak et al. | .................. 707/1 |
| 6,038,199 A | * | 3/2000 | Pawlowski et al. | ...... 369/29.02 |
| 6,571,211 B1 | * | 5/2003 | Dwyer et al. | ............... 704/270 |
| 6,671,567 B1 | * | 12/2003 | Dwyer et al. | ................. 700/94 |

* cited by examiner

*Primary Examiner*—Joseph Feild
*Assistant Examiner*—Peter J. Smith
(74) *Attorney, Agent, or Firm*—Jay H. Maioli

(57) ABSTRACT

A editing apparatus and an editing method that allow a source group name, a destination group name, the total number of files of each of the source group and the destination group, and the file insertion position of the destination group to be represented with an integrated icon in the case that a file categorized as a group and recorded in one of at least one record medium is moved to another group.

4 Claims, 17 Drawing Sheets

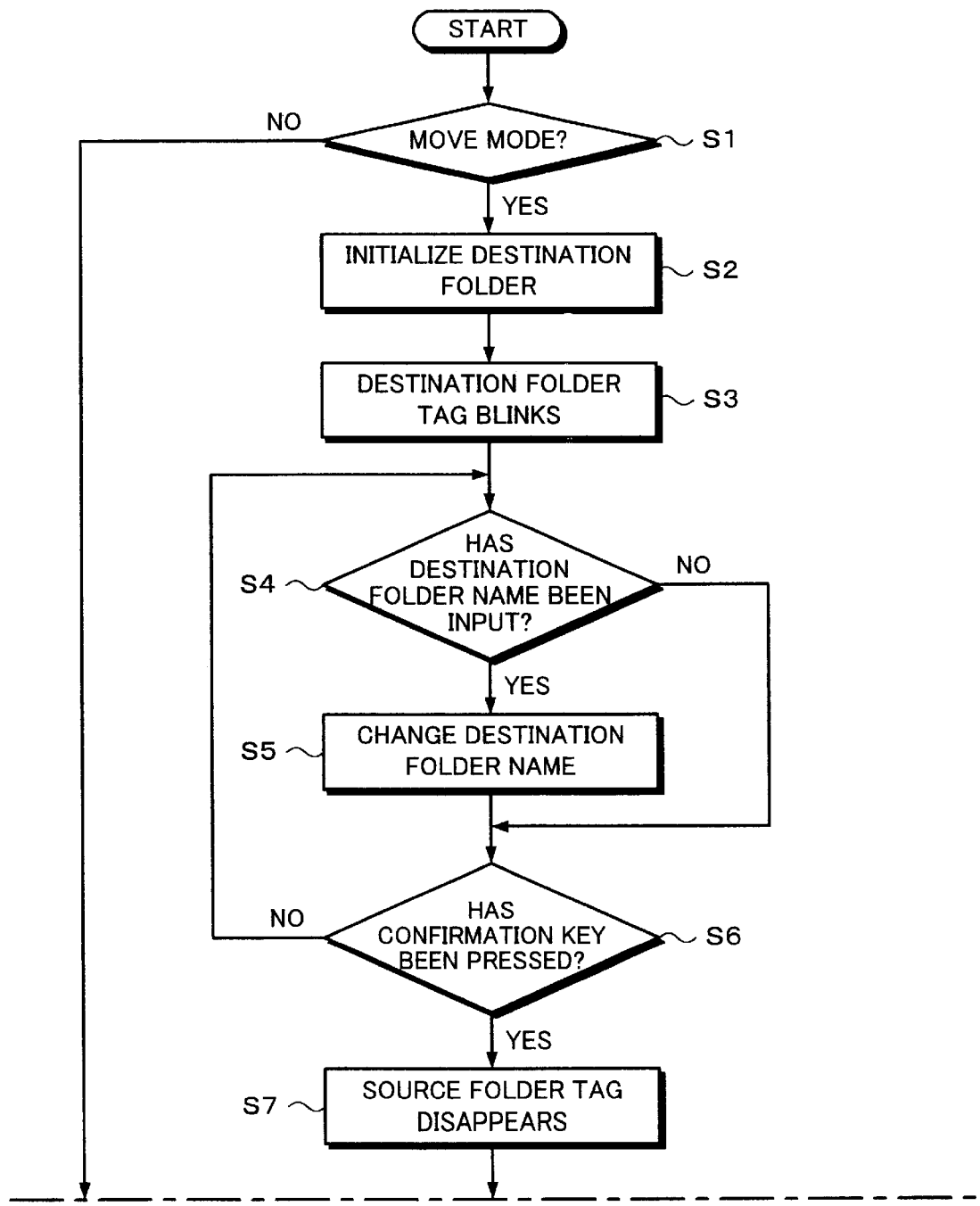

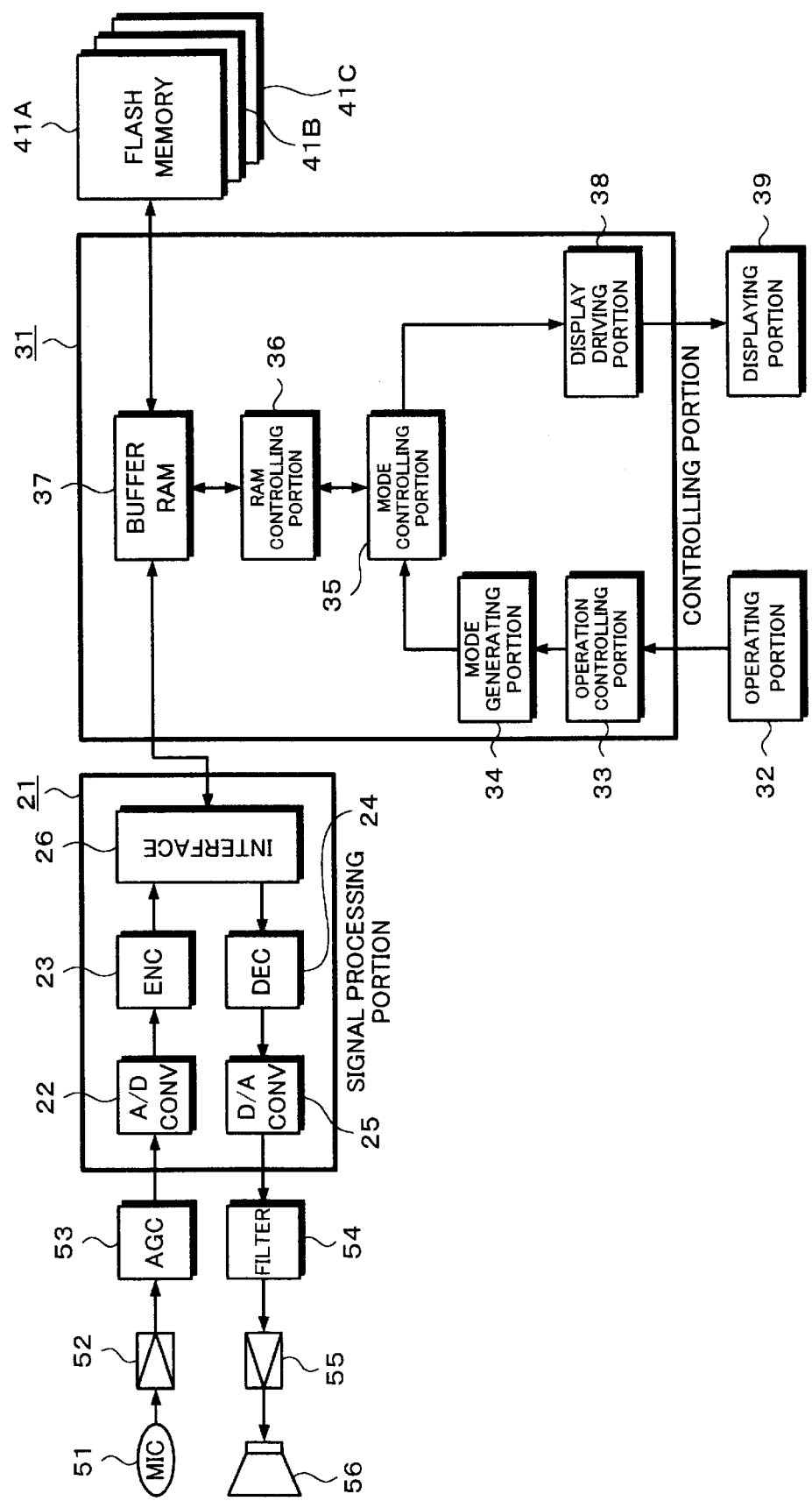

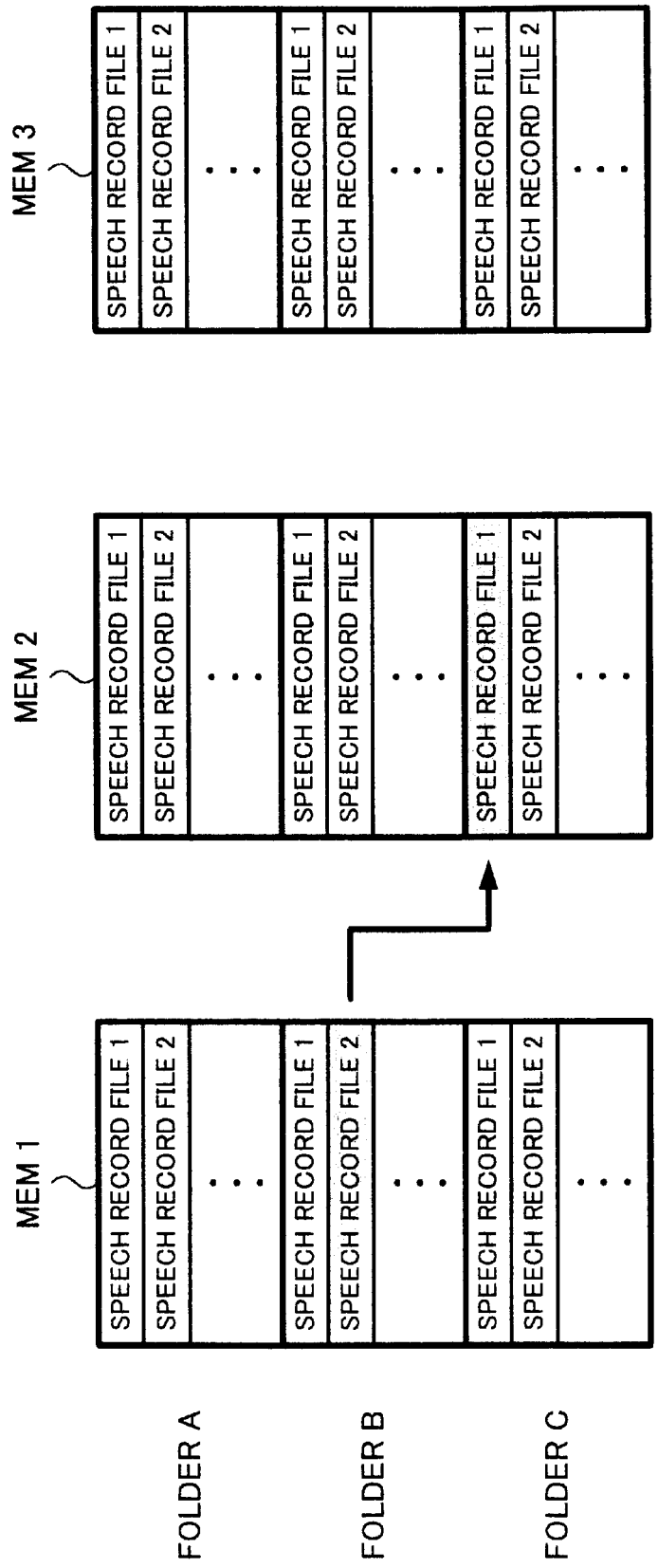

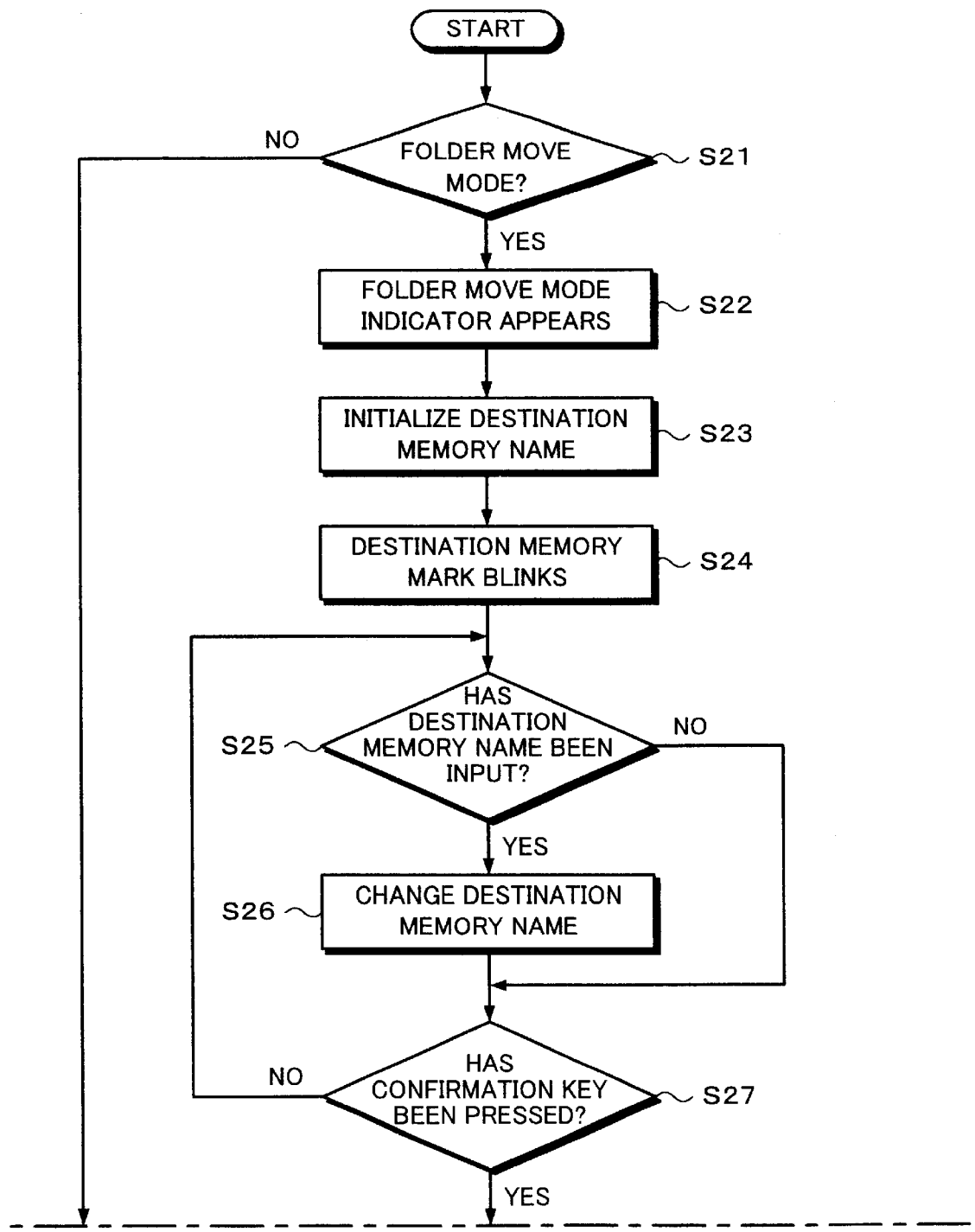

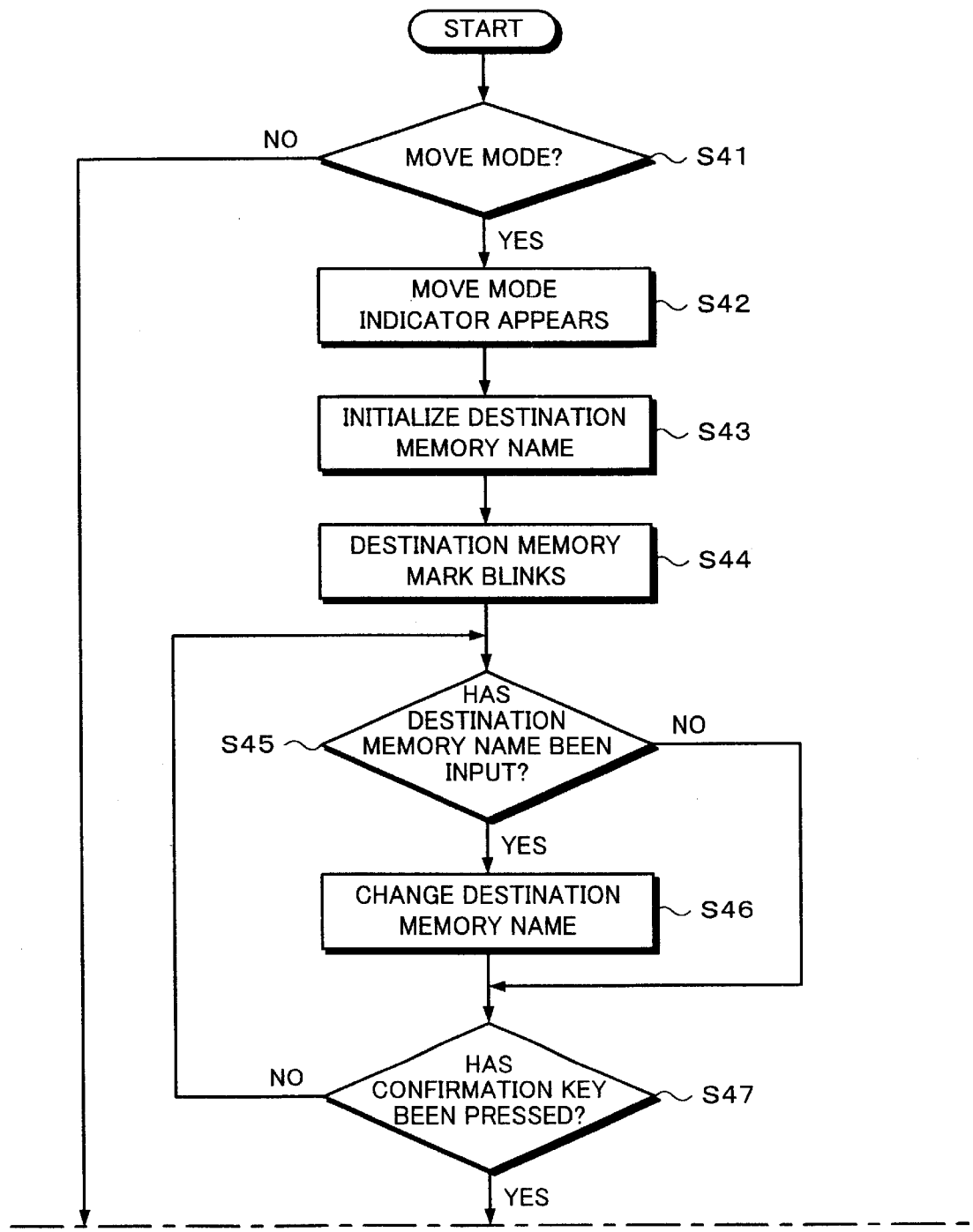

EDITING APPARATUS AND EDITING METHOD

BACKGROUND OF THE INVENTION

1. Field of the Invention

The present invention relates to an editing apparatus and an editing method that allow a source group name, a destination group name, the total number of files of each of the source group and the destination group, and the file insertion position of the destination group to be represented with an integrated icon in the case that a file categorized as a group and recorded in one of at least one record medium is moved to another group.

2. Description of the Related Art

An audio recording or reproducing apparatus that digitizes an audio signal that is input from a microphone, compresses the digital data, and records or reproduces the compressed data to/from a non-volatile semiconductor memory is known. Since an audio recording or reproducing apparatus having a non-volatile memory is small, light, portable, it is convenient. In addition, the audio recording or reproducing apparatus has a resistance against external vibration and shocks and is easy to handle. Thus, the audio recording or reproducing apparatus is suitable for recording a business conversation and a speech in a conference.

In recent years, non-volatile memories that have large storage capacities have been developed. Thus, the number of speech record files and the record time thereof are becoming large and long, respectively. However, when many speech record files are recorded to a non-volatile memory of an audio recording or reproducing apparatus, it is difficult for the user to search a desired speech record file.

To solve such a problem, in a particular audio recording or reproducing apparatus with a non-volatile semiconductor memory, files are categorized as groups (folders). When speech record files are categorized and managed as groups (folders), the speech record files are edited corresponding to user's purposes, he or she can easily search a desired file. In addition, individual users can record their speech record files with individual folders assigned thereto. Thus, one apparatus can be shared by a plurality of users. Moreover, each user can create different folder for business and private. The user can record speech record files to different folders depending on they relate to business, private, and so forth.

In the conventional audio recording or reproducing apparatus, speech record files are recorded in the chronological order. In the same folder, a speech record file that is recorded the first time is assigned speech record number 1. A speech record file that is recorded the second time is assigned speech record number 2. Likewise, a speech record file that is recorded the third time is assigned speech record number 3.

However, the order of speech record files that the user wants to reproduce does not always match the chronological order. In other words, the user sometimes wants to change the order of speech record files. In addition, the user may want to move a speech record file from one folder to another folder. However, with the conventional audio recording or reproducing apparatus, the user cannot change speed record numbers and move a speech record file from one folder to another folder.

In recent years, as non-volatile memory devices, card type detachable memory devices and stick type detachable memory devices have been placed on the market. Thus, the audio recording or reproducing apparatus may be equipped with such a detachable memory device. To allow the record time and the number of speech record files to increase, a plurality of non-volatile memory devices may be used. When a detachable non-volatile memory is used or a plurality of non-volatile memory devices are used, it is preferable to move a speech record file from one folder to another folder or move a folder in one memory device to another memory device.

OBJECTS AND SUMMARY OF THE INVENTION

A first aspect of the present invention is an editing apparatus for categorizing files stored in a record medium as a plurality of groups, managing the files with the groups, and moving a file recorded in the record medium in the same group or from one group to another group, comprising an operating means for designating a group to which a file is moved and an insertion position of the group, a displaying means for displaying the total number of files categorized as the designated group, the position number that represents the position of a designated file of all files of the designated group, and a tag that identifies the designated group, and a controlling means for causing said displaying means to display the group name designated by said operating means, the total number of files categorized as the designated group, and the position number of the file in the group designated by said operating means.

A second aspect of the present invention is an editing apparatus for categorizing files recorded in a plurality of record mediums as a plurality of groups, managing the files with the groups, and moving a group recorded in one record medium to another record medium, comprising an operating means for designating a record medium to which a group is moved and an insertion position of the group in the record medium, a displaying means for displaying a record medium name of the record medium to which the group is moved and a tap that represents a group name of the group of the record medium to which the group is moved, and a controlling means for causing said displaying means to display an identification name of the record medium designated by said operating means and the group name of the record medium to which the group is moved.

A third aspect of the present invention is an editing method for categorizing files recorded in a record medium as a plurality of groups, managing the files with the groups, and moving a file recorded in the record medium in the same group or from one group to another group, comprising the steps of (a) displaying a tag that represents a group name of a group to which a file is moved, the group name being designated by the user, (b) displaying the total number of files categorized as the group to which the file is moved, and (c) displaying a position number that represents the file insertion position of the file in the group along with the total number of files of the group.

A fourth aspect of the present invention is an editing method for categorizing files recorded in a plurality of record mediums as a plurality of groups, managing the files with the groups, and moving a group from a first record medium to a second record medium, comprising the steps of displaying an identification name of a record medium from which a group is moved, displaying a tag that represents a group name recorded in the record medium from which the group is moved, displaying an identification name of a record medium to which the group is moved, and displaying a tag that represents an insertion position of the group in the record medium to which the group is moved.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 4A is a functional flow chart for explaining a first state of the first embodiment according to the present invention;

FIG. 7 is a block diagram showing another example of the structure of the audio recording or reproducing apparatus according to the present invention;

FIG. 9A is a first schematic diagram for explaining a process for moving a speech record file from one memory to another memory;

FIG. 9B is a second schematic diagram for explaining a process for moving a speech record file from one memory to another memory;

FIG. 9C is a third schematic diagram for explaining a process for moving a speech record file from one memory to another memory;

FIG. 10A is a functional flow chart for explaining a first state of the second embodiment according to the present invention;

FIG. 12A is a functional flow chart for explaining the structure of a first state of the third embodiment according to the present invention;

DETAILED DESCRIPTION OF THE PREFERRED EMBODIMENTS

Figure 1C:
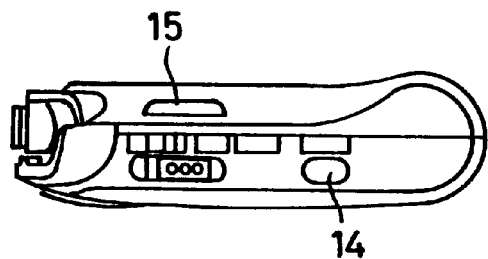
FIG. 1C is a top view showing an example of the structure of the audio recording or reproducing apparatus according to the present invention.
Figure 1B:
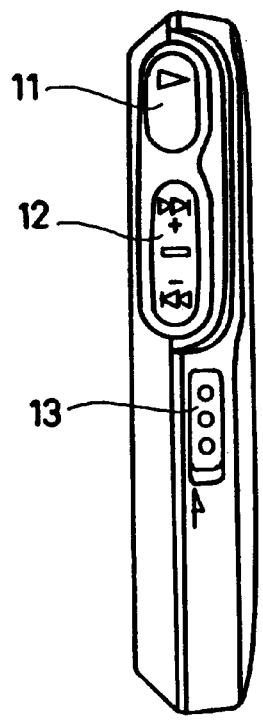
FIG. 1B is a side view showing an example of the structure of the audio recording or reproducing apparatus according to the present invention.
Figure 1A:
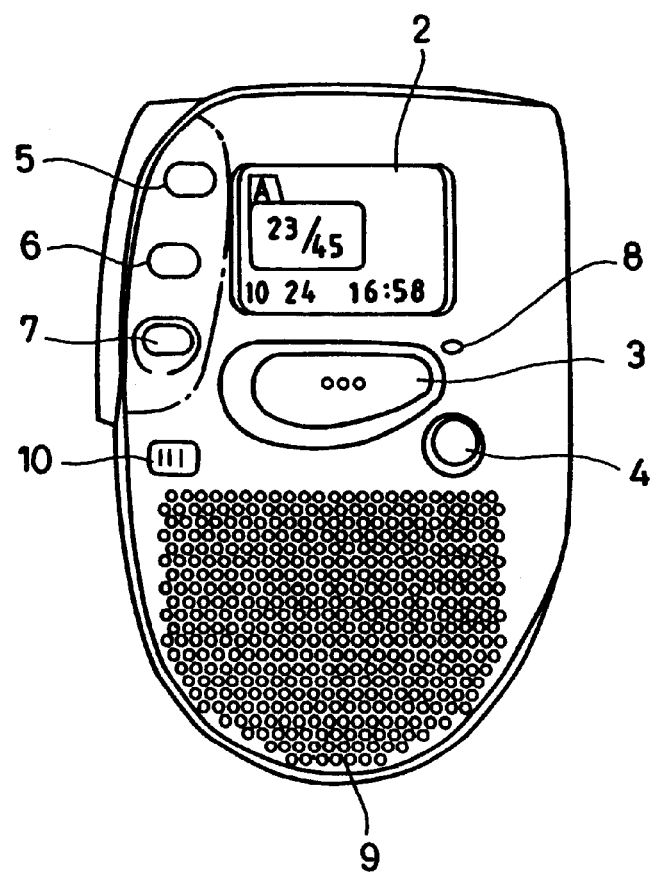
FIG. 1A is a front view showing an example of the structure of an audio recording or reproducing apparatus according to the present invention.

Next, with reference to the accompanying drawings, embodiments of the present invention will be described. FIGS. 1A, 1B, and 1C show the overall structure of an audio recording or reproducing apparatus according to the present invention. As shown in FIG. 1A, a displaying portion 2 is disposed on the front surface of the audio recording or reproducing apparatus 1. In addition, a record button 3, an erase button, a file button 5, an important mark button 6, and a stop button 7 are disposed. Moreover, an indicator lamp 8, a speaker 9, and a microphone 10 are disposed.

The displaying portion 2 is for example a liquid crystal displaying device. The displaying portion 2 displays information of speech record files, record time thereof, and so forth. Recorded audio information is managed as a speech record file.

The record button 3 is used to set or pause the record mode. When the record button 3 is momentarily pressed, the audio recording or reproducing apparatus 1 is set to the record mode. When an external audio signal is input in the record mode, the audio signal is recorded to a non-volatile semiconductor memory disposed in the audio recording or reproducing apparatus 1. While a speech record file is being recorded, the indicator 8 lights in red. While a speech record file is being recorded, when the record button 3 is pressed, the recording operation is paused.

The erase button 4 is used to erase a speech record file recorded in the non-volatile semiconductor memory disposed in the audio recording or reproducing apparatus 1. While a speech record file is being reproduced, when the erase button 4 is momentarily pressed or while the recording operation is paused, when the erase button 4 is continuously pressed, the apparatus is set to the one speech record file erase mode. Thereafter, when the erase button 4 is momentarily pressed, the speech record file is erased. To erase all speech record files stored in the non-volatile semiconductor memory, the erase button 4 is continuously pressed with the stop button 7 pressed. Thereafter, the erase button 4 is momentarily pressed.

The folder button 5 is used to select a folder icon. The important mark button 6 is used to change the priority order of speech record files.

As shown in FIG. 1B, a playback button 11, an FF/REW button 12, and a hold switch 13 are disposed on a side surface of the audio recording or reproducing apparatus 1.

While the audio recording or reproducing apparatus 1 is being stopped, when the playback button 11 is momentarily pressed, a speech record file recorded in the non-volatile semiconductor memory disposed in the audio recording or reproducing apparatus 1 is reproduced. The reproduced sound is output from the speaker 9. While a speech record file is being reproduced, when the playback button 11 is momentarily pressed, the reproducing operation is paused. While a speech record file is being recorded, when the playback button 11 is momentarily pressed, the speech record file that has been just recorded is reproduced. On the other hand, while a speech record file is being recorded, when the playback button 11 is continuously pressed, the speech record file is repeatedly reproduced. While the audio recording or reproducing apparatus 1 is being stopped, when the playback button 1 is continuously pressed, speech record files are scan-reproduced.

When the FF/REW button 12 is momentarily pressed, a searching operation is performed. Likewise, while a speech record file is being reproduced, when the FF/REW button 12 is momentarily pressed, the searching operation is also performed. While a speech record file is being reproduced, when the FF/REW button 12 is continuously pressed, the speech record file is cued or reviewed.

The hold switch 13 is used to hole the current mode of the audio recording or reproducing apparatus 1. When the hold switch 13 is turned on, all key operations are disabled.

As shown in FIG. 1C, a menu button 14 and a rotating audio volume controller 15 are disposed on the top surface of the audio recording or reproducing apparatus 1. When the menu button 14 is momentarily pressed, the audio recording or reproducing apparatus 1 enters into a menu mode. With the FF/REW button 12, each mode of the audio recording or reproducing apparatus 1 is set. The rotating audio volume controller 15 is used to set the volume level of a speech record file.

Figure 2:
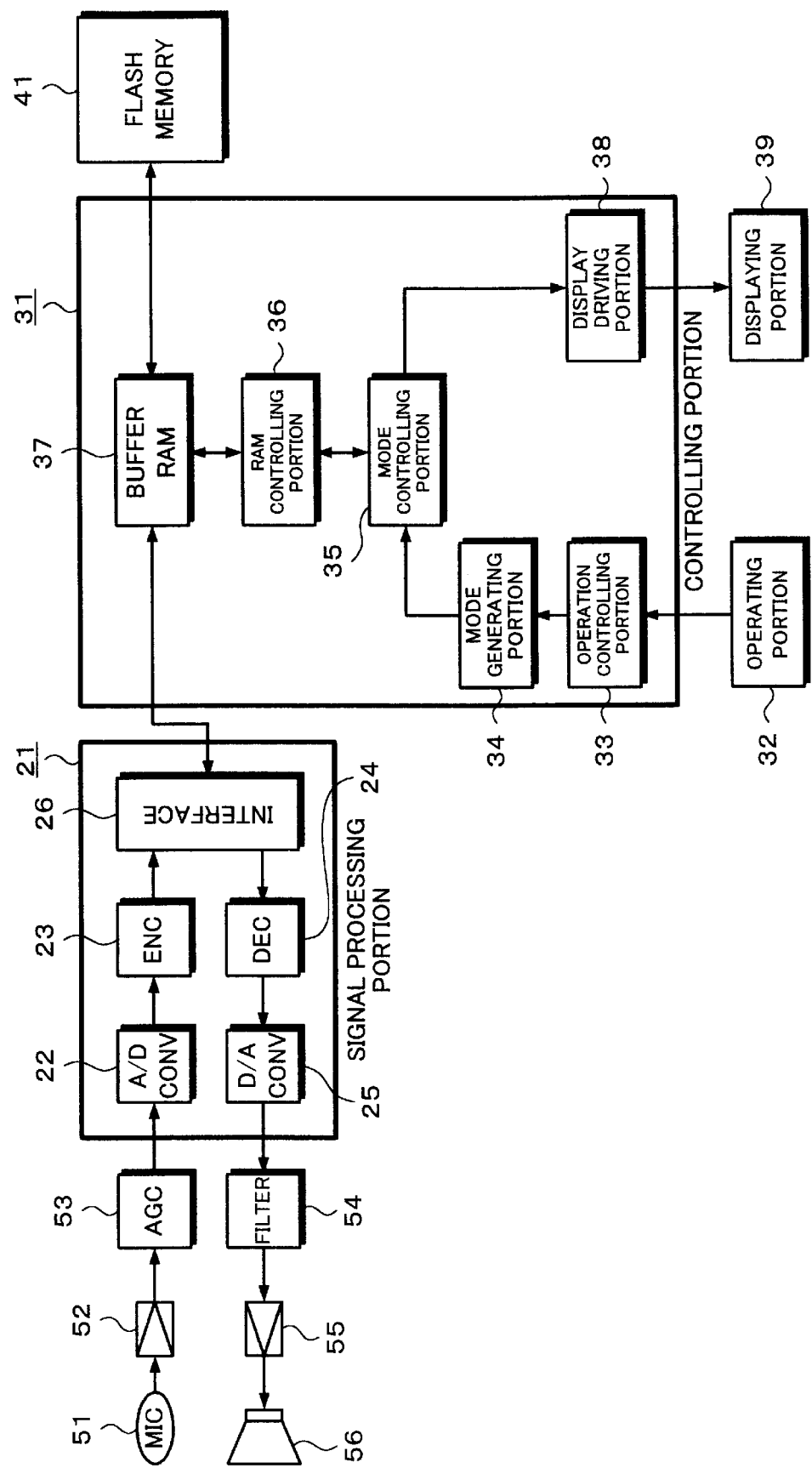
FIG. 2 is a block diagram showing an example of the structure of the audio recording or reproducing apparatus according to the present invention.

FIG. 2 is a block diagram showing the structure of the audio recording or reproducing apparatus according to the present invention. In FIG. 2, reference numeral 21 is a signal processing portion. The signal processing portion 21 performs an encoding process or a decoding process for an audio signal. The signal processing portion 21 is composed of a DSP (Digital Signal Processor). The signal processing portion 21 comprises an A/D converter 22, an encoder 23, a decoder 24, a D/A converter 25, and an interface 26. The encoder 23 compression-encodes audio data corresponding to for example ADPCM (Adaptive Differential Pulse Code Modulation). The decoder 24 decodes data that has been encoded corresponding to ADPCM. The encoding method is not limited to ADPCM. Instead, another encoding method such as ATRAC (Adaptive Transform Acoustic Coding) can be used.

Reference numeral 31 is a controlling portion. The controlling portion 31 controls the overall system. The controlling portion 31 may be composed of a microcomputer. The controlling portion 31 receives an input signal from an operating portion 32. The operating portion 32 corresponds to the individual buttons of the audio (message) recording or reproducing apparatus shown in FIGS. 1A, 1B, and 1C. An output signal of the operating portion 32 is supplied to an operation controlling portion 33. The operation controlling portion 33 recognizes and delivers operation information. An output signal of the operation controlling portion 33 is supplied to a mode generating portion 34. The mode generating portion 34 generates a mode control command corresponding to the output signal of the operating portion 32. An output signal of the mode generating portion 34 is supplied to a mode controlling portion 35. The mode controlling portion 35 sets a mode corresponding to the output signal of the mode generating portion 34.

A RAM controlling portion 36 controls a reading operation or a writing operation of a buffer RAM 37 corresponding to a mode that is set by the mode controlling portion 35. A display driving portion 38 generates a display signal corresponding the mode that is set by the mode controlling portion 35. A displaying portion 39 displays data corresponding to the display signal. The displaying portion 39 corresponds to the displaying portion 2 shown in FIG. 1A.

Reference numeral 41 is a flash memory. The flash memory 41 is composed of a non-volatile semiconductor memory. The flash memory 41 is used as a record medium for speech record files. Since the flash memory 41 is a non-volatile semiconductor memory, even if the main power of the audio recording or reproducing apparatus 1 is turned off, the data stored in the flash memory 41 is not lost.

When a speech record file is recorded, an external audio signal is input from a microphone 51 that corresponds to the microphone 10 shown in FIG. 1A. An output signal of the microphone 51 is supplied to an A/D converter 22 of a signal processing circuit 21 through an amplifier 52 and an AGC (Automatic Gain Control) circuit 53.

The A/D converter 22 converts an analog audio signal into digital data. Output data of the A/D converter is supplied to an encoder 23. The encoder 23 compression-encodes the digital audio data (received from the A/D converter 22) corresponding to for example ADPCM.

The output data of the encoder 23 is supplied to a buffer RAM 37 of the controlling portion 31 through the interface circuit 26. The output data of the encoder 23 is temporarily stored in the buffer RAM 37. Output data of the buffer RAM 37 is stored to the flash memory 41.

When a desired speech record file is reproduced, relevant data is read from the flash memory 41. Output data of the flash memory 41 is temporarily stored to the buffer RAM 37. Thereafter, the output data of the flash memory 41 is supplied to the decoder 24 through the interface portion 26 of the signal processing portion 21. The decoder 24 performs a decoding process for the data that has been encoded corresponding to ADPCM and that has been read from the flash memory 41. Output data of the decoder 24 is supplied to the D/A converter 25. The D/A converter 25 converts the digital audio signal into an analog audio signal.

An output signal of the D/A converter 25 is supplied to a speaker 56 through a filter circuit 54 and an amplifier 55. The speaker 56 corresponds to the speaker shown in FIG. 1A. The speaker 56 outputs reproduced sound corresponding to the reproduced data that is read from the flash memory 41.

The audio recording or reproducing apparatus 1 records audio data to the flash memory 41. Since the audio recording or reproducing apparatus 1 is small, light, and portable, has a resistance against mechanical vibration, and is handy, it is suitable for recording business talks, interviews, and conference speeches. In addition, music data can be recorded to the flash memory 41 of the audio recording or reproducing apparatus 1. Thus, the audio recording or reproducing apparatus 1 may be used as a headset stereo unit.

The audio recording or reproducing apparatus 1 according to the present invention manages a predetermined number of speech record files as a folder. In a move mode, a speech record file can be moved from one folder to another folder. Alternatively, a particular speech record number can be changed in the same folder.

Figure 3:
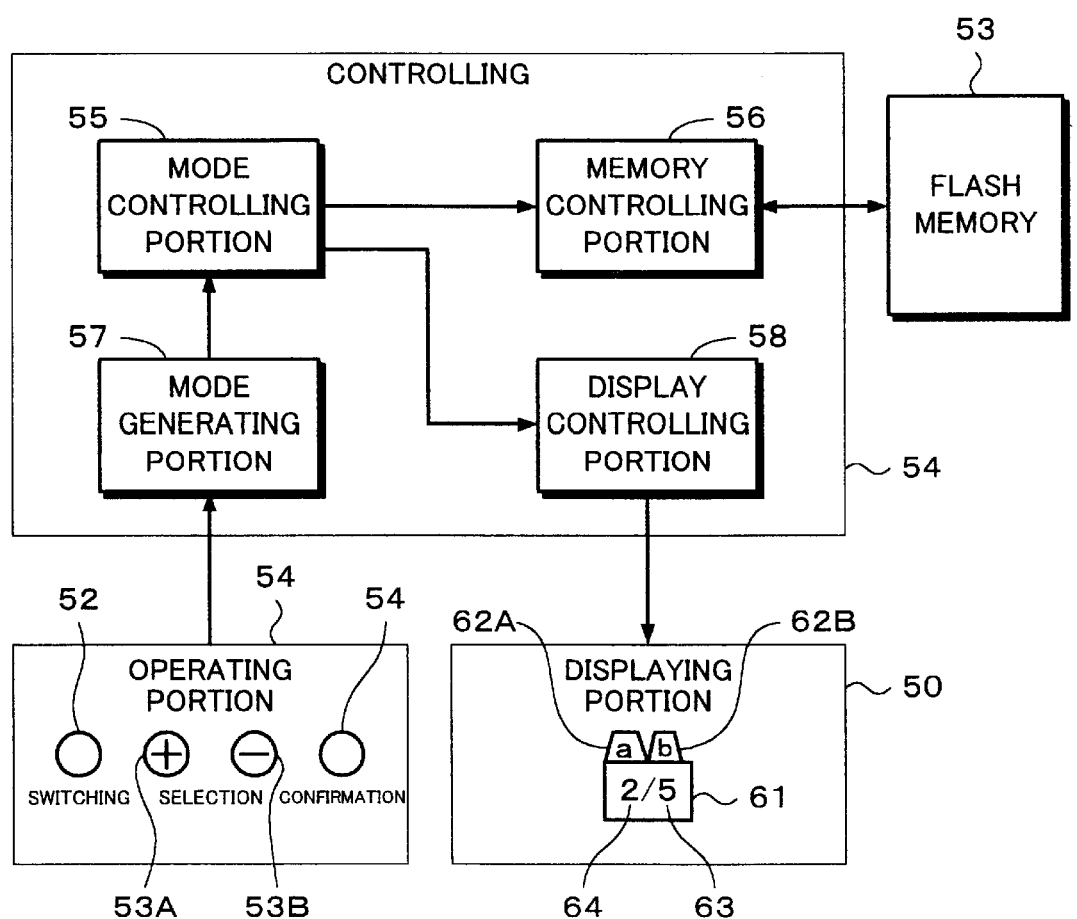
FIG. 3 is a functional block diagram for explaining a first embodiment of the present invention.

FIG. 3 is a functional block diagram for explaining a process for moving a speech record file from one folder to another folder and a process for changing a speech record number in the same folder.

As shown in FIG. 3, an operating portion 51 has a mode switching key 52, selection keys 53A and 53B, and a confirmation key 54. The displaying portion 50 displays a folder icon 61. The folder icon 61 represents a speech record file recorded in a flash memory 53. A controller 54 has a mode controlling portion 55, a memory controlling portion 56, a mode generating portion 57, and a display controlling portion 58.

In FIG. 3, the operating portion 51, the displaying portion 50, the flash memory 53, and the controller 54 correspond to the operating portion 32, the displaying portion 39, the flash memory 41, and the controller 31, respectively.

To decrease the number of keys, the mode switching key 52, the selection keys 53A and 53B, and the confirmation key 54 disposed in the operating portion 51 are accomplished with combinations of other keys. For example, the mode switching key 52 is accomplished by pressing the record button 3 and the file button 5 shown in FIG. 1A at the same time. The selection keys 53A and 53B are accomplished by the FF/REW button 12. Likewise, the confirmation key 54 is accomplished by the record button 3.

Data that is input to the operating portion 51 is supplied to the mode generating portion 57. The mode generating portion 57 generates a mode signal corresponding to the input data of the operating portion 51. Output data of the mode generating portion 57 is supplied to the mode controlling portion 55. Thus, the apparatus is set to a mode corresponding to the input data of the operating portion 51.

Output data of the mode controlling portion 55 is supplied to both the memory controlling portion 56 and the display controlling portion 58. The memory controlling portion 56 controls a reading operation or a writing operation for the flash memory 53 corresponding to the operation mode. The display controlling portion 58 displays data corresponding to the operation mode.

When a speech record file is moved from one folder to another folder, the apparatus is set to the move mode with the mode switching key 52 of the operating portion 51. When the apparatus is set to the move mode, a process for changing a destination folder is performed. At this point, the folder icon 61 of the displaying portion 50 shows a tag 62A and a tag 62B. The tag 62A represents a source folder. The tag 62B represents a destination folder. A desired destination folder represented by the tag 62B is selected with the selection keys 53A and 53B.

After the desired destination folder has been selected, with the confirmation key 54, the selected destination folder is confirmed.

After the destination folder has been confirmed, a process for changing a speech record number is performed. At this point, with the selection keys 53A and 53B, a desired speech record number is selected. The total number of speech record files of the folder is represented by an indicator 63 of the folder icon 61. The current folder number is represented by an indicator 64 of the folder icon 61. With the selection keys 53A and 53B, a desired speech record number can be selected on the indicator 64 that represents the current folder number.

After the desired speech record number has been selected, with the confirmation key 54, the speech record number of the destination folder is confirmed.

After a destination folder is designated with the selection keys 53A and 53B, the confirmation key 54 is pressed. After a speech record number of the destination folder is selected, the confirmation key 54 is pressed. Thus, a selected speech record file can be moved from one folder to another folder. All operations can be visually performed with reference to the tags of the folder icon 61. Thus, a good user interface is provided.

In the case that a speech record number is moved in the same folder, when the destination folder name changing process is performed, the source folder and the destination folder are designated as the same folder. In other words, with the selection keys 53A and 53B, a desired destination folder is selected so that the source folder represented by the tag 62A is the same as the destination folder represented by the tag 62B. Thereafter, the confirmation key 54 is pressed. In this state, when the speech record number changing process is performed, a speech record number is changed in the same folder. Consequently, with the same operation, a speech record file can be moved from one folder to another folder. In addition, a speech record number can be changed in the same folder.

Figure 4B:
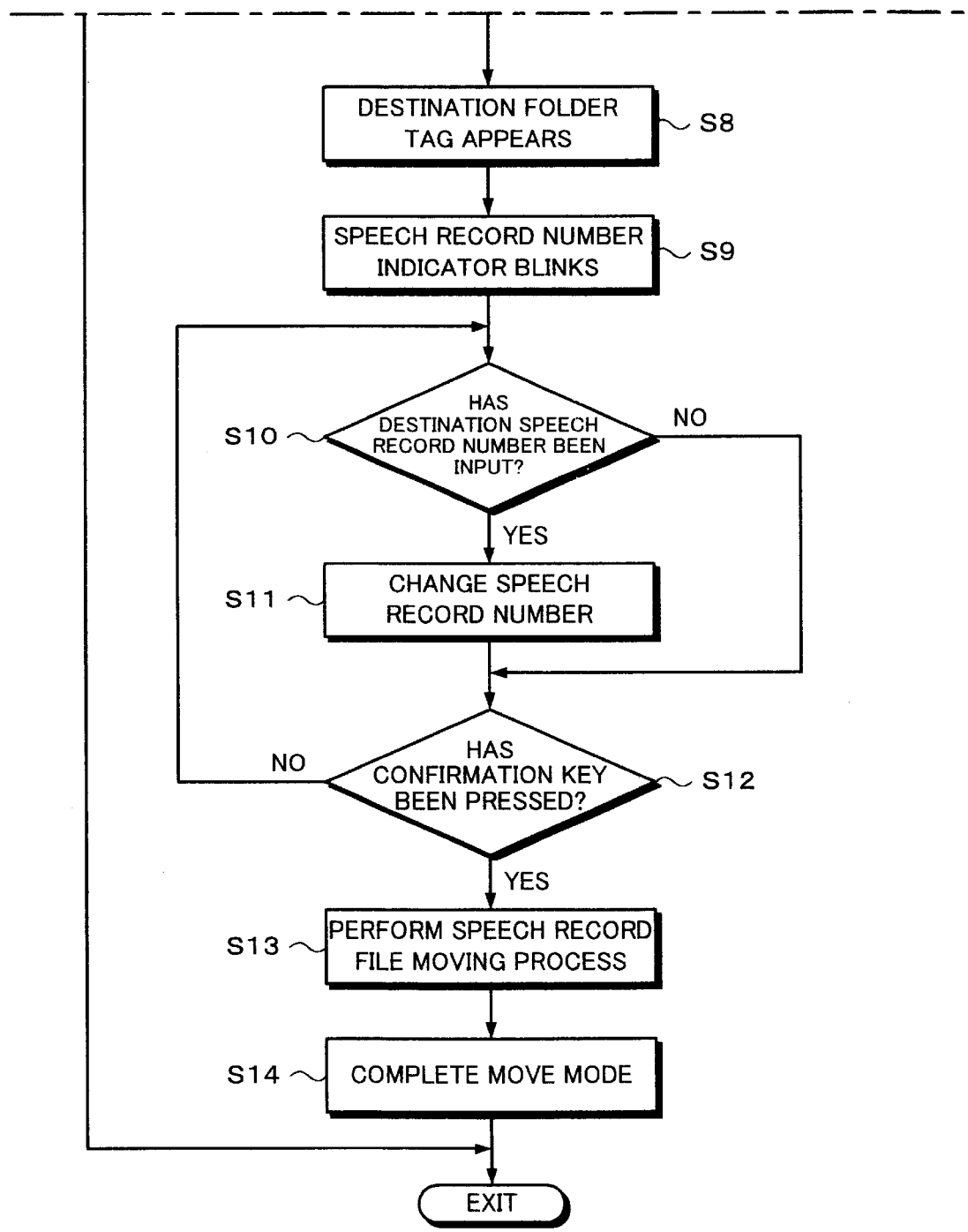
FIG. 4B is a functional flow chart for explaining a second state of the first embodiment according to the present invention.

FIG. 4 is a flow chart showing a process for moving a speech record file from one folder to another folder and a process for changing a speech record number in the same folder.

In FIG. 4, at step S1, it is determined whether or not the apparatus has been set to the move mode. The apparatus is set to the move mode with the mode switching key 52. When the determined result at step S1 is No, the process is terminated. When the determined result at step S1 is Yes, the flow advances to step S2. At step S2, a destination folder is initialized.

When the apparatus has been set to the move mode, at step S3, in the folder icon, the tag 62A that represents a source folder name lights and the tag 62B that represents a destination folder blinks. Thereafter, the flow advances to step S4. At step S4, it is determined whether or not a destination folder to be changed has been input.

When the selection keys 53A and 53B are operated, a destination folder is changed. The tag 62B that represents a destination folder name blinks. When the determined result at step S4 is Yes, the flow advances to step S5. At step S5, the destination folder name is changed corresponding to the destination folder number that has been input.

Thereafter, the flow advances to step S6. At step S6, it is determined whether or not the input destination folder name has been confirmed with the confirmation key 54. When a destination folder name has been decided, the confirmation key 54 is pressed. When the determined result at step S6 is No, the flow returns to step S4. At step S4, the destination folder name changing process is repeated.

In the loop of steps S4 to S6, the destination folder name changing process is performed. After the destination folder name has been decided, the flow advances to step S6. At step S6, the confirmation key 54 is pressed.

When the determined result at step S6 is Yes, the flow advances to step S7. At step S7, the tag 62A that represents the destination folder name disappears. At step S8, only the tag 62B that represents the destination folder name appears. Thereafter, the flow advances to step S9. At step S9, the total number of files and the current speech record number represented by the tags 63 and 64, respectively, of the folder icon 61 are changed to those of the destination folder. The indicator 64 that represents the speech record number of the destination folder blinks. At this point, the speech record number of the destination folder can be changed. Thereafter, the flow advances to step S10. At step S10, it is determined whether or not the speech record number of the destination folder has been changed with the selection keys 53A and 53B.

With the selection keys 53A and 53B, the speech record number of the destination folder can be changed. The indicator 64 that represents the current speech record number of the destination folder blinks. When the determined result at step S10 is Yes, the flow advances to step S11. At step S11, the speech record number of the destination folder is changed corresponding to the input destination speech record number. When the determined result at step S10 is No, the flow advances to step S12. At step S12, it is determined whether or not the confirmation key 54 has been pressed.

When the speech record number has been changed, the flow advances to step S12. At step S12, it is determined whether or not the confirmation key 52 has been pressed. When the speech record number has been decided, the confirmation key 54 is pressed. When the determined result at step S12 is No, the flow returns to step S10. At step S10, the destination folder name changing process is repeated.

In the loop of step S10 to step S12, the speech record number changing process is performed for the destination folder. When the input speech record number of the destination folder has been confirmed, the determined result at step S12 becomes Yes.

When the determined result at step S12 is Yes, the flow advances to step S13. At step S13, a process for moving a speech record file from one folder to another folder is performed. Thereafter, the flow advances to step S14. At step S14, the process is completed.

Thus, with the above-described process, both a process for moving a speech record file from one folder to another folder and a process for changing a speech record number in the same folder can be performed.

FIGS. 5A, 5B, 5C, and 5D show a process for moving a speech record file from one folder to another folder.

Figure 5A:
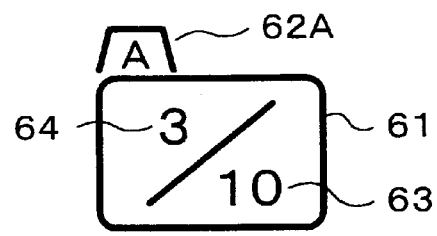
FIG. 5A is a schematic diagram showing a first state of the first embodiment according to the present invention.

As shown in FIG. 5A, it is assumed that the current folder name is A as represented by the tag 62A, the folder A has a total of 10 speech record files as represented by the indicator 63, and the current speech record number is 3 as represented by the indicator 64. In addition, it is assumed that a speech record file (speech record number 3) of a folder A is moved to a speech record file (speech record number 7) in a folder C.

Figure 5B:
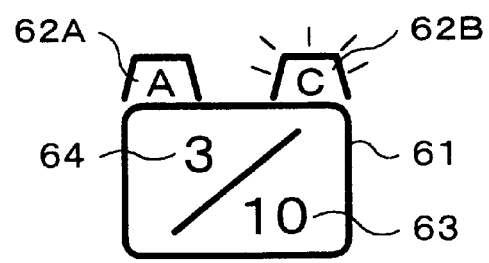
FIG. 5B is a schematic diagram showing a second state of the first embodiment according to the present invention.

When a speech record file is moved from one folder to another folder, the apparatus is set to the move mode. In the move mode, as shown in FIG. 5B, tag 62A that represents a source folder name and the tag 62b that represents a destination folder name blink. At this point, a speech record file name represented by the tag 62A and the indicator 64 is a file to be moved.

In FIG. 5B, the destination folder name represented by the tag 62B is C. However, it should be noted that the destination folder name represented by the tag 62B is not always C. In other words, a source folder name that has been selected by the user may be represented by the tag 62B that blinks as default. Alternatively, a destination folder name that has selected by the user may be presented by the tag 62B that blinks as default.

At this point, with the selection keys 53A and 53B, the destination folder name represented by the tag 62A is moved in the order of A, B, and C. In this example, since the destination folder name is C, with the selection keys 53A and 53B, the destination folder name is selected so that the destination folder name represented by the tag 62B that blinks becomes C.

Figure 5C:
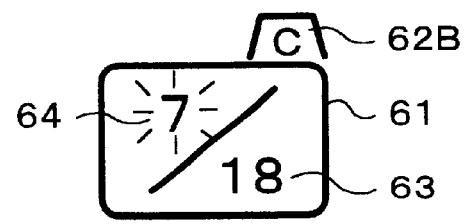
FIG. 5C is a schematic diagram showing a third state of the first embodiment according to the present invention.

After the destination folder name has been selected, the confirmation key 54 is pressed. When the confirmation keys 54 is pressed, as shown in FIG. 5C, the tag 62 that represents the destination folder name A disappears. Only the tag 62B that represents the destination folder name C appears. In addition, the total number of speech record files and the current speech record number represented by the indicators 63 and 64, respectively, of the folder icon 61 are changed to those of the destination folder. In addition, the indicator 64 that represents the current speech record number blinks.

The default destination speech record number that is represented by the indicator 64 can be designated in various manners. In the example shown in FIG. 5C, the default destination speech record number represented by the indicator 64 that blinks is 7. Alternatively, the default destination speech record number represented by the indicator 64 that blinks may be 1 that is the smallest speech record number. Alternatively, the default destination speech record number represented by the indicator 64 that blinks may be 1 that is the largest speech record number. In addition, the default destination record number represented by the indicator 64 may be initially designated by the user. Alternatively, the default destination speech record number represented by the indicator 64 that blinks may be a destination speech record number that has been designated by the user last time.

With the selection keys 53A and 53B, the speech record number of the destination folder is changed. In this example, since the speech record number of the destination folder is 7, with the selection keys 53A and 53B, the speech record number is selected so that the speech record number represented by the indicator 64 becomes 7.

Figure 5D:
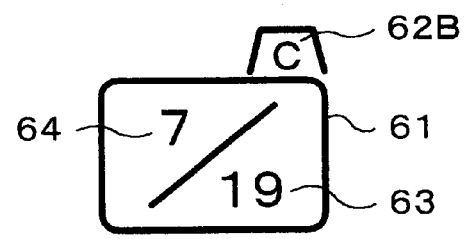
FIG. 5D is a schematic diagram showing a fourth state of the first embodiment according to the present invention.

After the speech record number of the destination folder has been selected, the confirmation key 54 is pressed. When the confirmation key 54 is pressed, as shown in FIG. 5D, the speech record file is moved to the speech record file (speech record number 7) of the destination folder C. Since one speech record file has been inserted into the destination folder C, the total number of speech record files represented by the indicator 63 becomes 19.

FIGS. 6A, 6B, 6C, and 6D show a process for moving a speech record file in the same folder (namely, for changing a speech record file in a folder). This process can be performed in the same manner as the process for moving a speech record file from one folder to another folder.

Figure 6A:
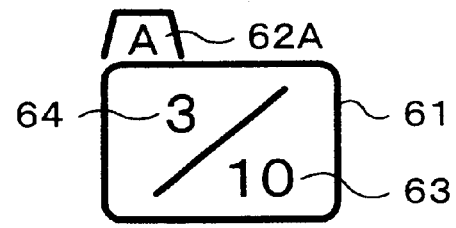
FIG. 6A is a schematic diagram showing a first state of the first embodiment according to the present invention.

As shown in FIG. 6A, it is assumed that the current folder name is A, the total number of speech record files in the folder A is 10, and the current speech record number is 3. In addition, it is assumed that the speech record file (speech record number 3) is moved to the speech record file (speech record number 8) in the same folder.

When a speech record file is moved in the same folder, the apparatus is set to the move mode. When the apparatus is set to the move mode, as shown in FIG. 6B, along with the tag 62A that represents a source folder name, the tag 62B that represents a destination folder number blinks.

With the selection keys 53A and 53B, the destination folder name represented by the tag 62B is changed. In this example, the destination folder name is changed in the order of A, B, and C. In this example, since the speech record file is moved in the same folder, with the selection keys 53A and 53B, the destination folder name is selected so that the destination folder name represented by the tag 62B becomes A. At this point, since the source folder name is the same as the destination folder name, as shown in FIG. 6B, the tag 62A that represents the source folder name is in common with the tag 62B that represents the destination folder name.

Figure 6B:
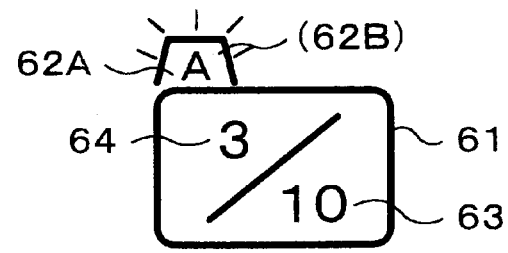
FIG. 6B is a schematic diagram showing a second state of the first embodiment according to the present invention.

In FIG. 6B, the destination folder name represented by the tag 62B is A. However, it should be noted that the destination folder name is not limited to A. For example, the default destination folder name that is represented by the tag 62B may be different from the source folder name. For example, a folder name that has been selected by the user may be represented by the tag 62B that blinks. Alternatively, a destination folder name that has been selected by the user last time may be represented by the tag 62B as default.

Figure 6C:
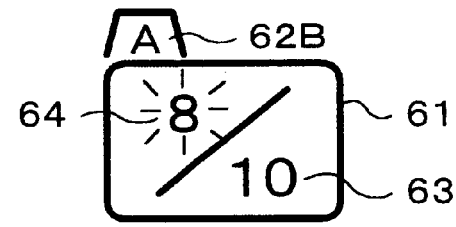
FIG. 6C is a schematic diagram showing a third state of the first embodiment according to the present invention.

After the destination folder name has been selected, the confirmation key 54 is pressed. When the confirmation key 54 is pressed, the tag 62A that represents the source folder name A disappears. Only the tag 62b that represents the destination folder name A appears. The total number of speech record files and the current speech record number represented by the indicators 63 and 64, respectively, of the folder icon 61 are changed to those of the destination folder. The indicator 64 that represents the current speech record number blinks. However, in this example, since the source folder name and the destination folder name are the same (in this example, the folder name is A), as shown in FIG. 6C, the indicator 64 that represents the current speech record number blinks.

The default destination speech record number represented by the indicator 64 that blinks can be designated in various manners. In FIG. 6C, the default speech record number represented by the indicator 64 that blinks is 8. It should be noted that the default speech record number represented by the indicator 64 that blinks may be 1 that is the smallest speech record number. Likewise, the default speech record number represented by the indicator 64 that blinks may be the largest speech record number. Alternatively, the default speech record number represented by the indicator 64 that blinks may be preset by the user. Likewise, the default speech record number represented by the indicator 64 that blinks may be a destination speech record number that has been selected last time by the user.

With the selection keys 53A and 53B, the speech record number of the destination folder is changed. In this example, since the speech record number of the destination folder is 8, with the selection keys 53A and 53B, the speech record number 8 is selected so that the speech record number represented by the indicator 64 becomes 8.

Figure 6D:
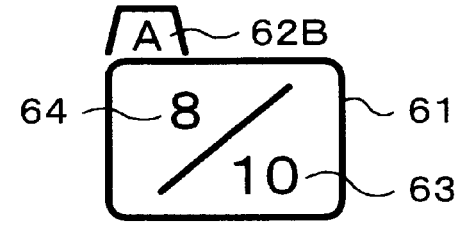
FIG. 6D is a schematic diagram showing a fourth state of the first embodiment according to the present invention.

After the speech record number of the destination folder has been selected, the confirmation key 54 is pressed. When the confirmation key 54 is pressed, as shown in FIG. 6D, the speech record file is moved to the speech record file (speech record number 8) of the folder A.

The folder icon 61 has the indicator 63 that represents the total number of speech record files and the indicator 64 that represents the current speech record number. In addition, the folder icon 61 has the tags 62A and 62B that represent folder names. With the folder icon 61, the user can visually change a speech record file from one folder to another folder and change a speech record file in the same folder.

In the audio recording or reproducing apparatus shown in FIG. 2, speech record files are recorded to the flash memory 41 that is a fixed memory device. As an example of the flash memory 41, a card type or stick type detachable flash memory can be used.

In the above-described example, speech record files are recorded to one flash memory 41. Alternatively, as shown in FIG. 7, speech record files can be recorded to a plurality of flash memories 41A, 41B, and 41C.

As described above, when a detachable flash memory is used or a plurality of flash memories are used, a folder or a speech record file can be moved from one memory to another memory.

Figure 8A:
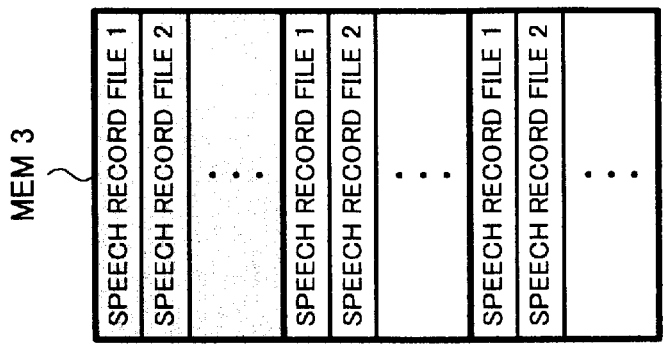
FIG. 8A is a first schematic diagram for explaining a process for moving a folder from one memory to another memory.
Figure 8B:
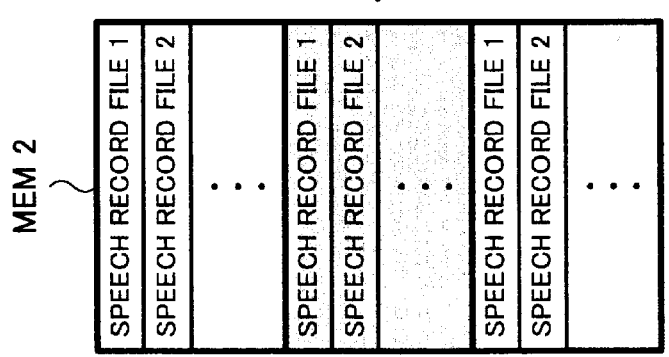
FIG. 8B is a second schematic diagram for explaining a process for moving a folder from one memory to another memory.
Figure 8C:
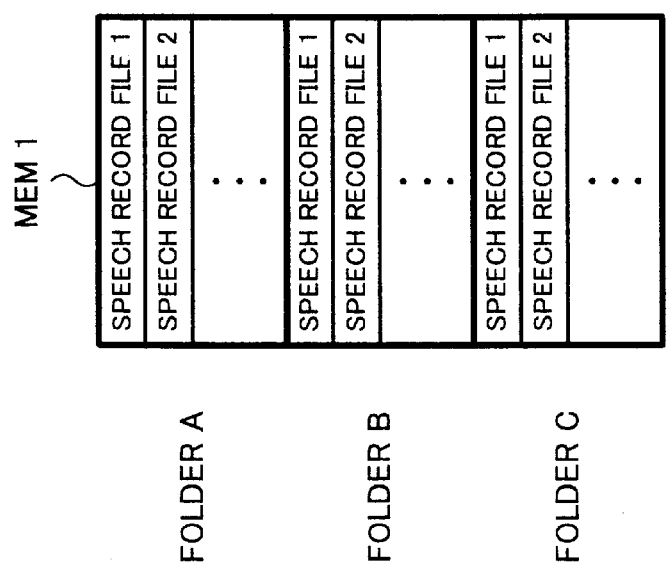
FIG. 8C is a third schematic diagram for explaining a process for moving a folder from one memory to another memory.

In other words, as shown in FIGS. 8A, 8B, and 8C, it is assumed that memories MEM1, MEM2, and MEM3 are disposed, each memory has folders A, B, and C, and each folder stores speech record files 1, 2, and 3. In this example, a process for moving all speech record files of the folder B of the memory MEM2 to the folder A of the memory MEM3 is a process for moving a folder from one memory to another memory. When a folder is moved in such a manner, speech record files 1, 2, 3 in the folder are moved together.

As shown in FIGS. 9A, 9B, and 9C, a process for moving for example the speech record file (speech record number 2) of the folder B of the memory MEM1 to the speech record file (speech record number 1) of the folder C of the memory MEM2 is a process for moving a speech record file from one memory to another memory.

Figure 10B:
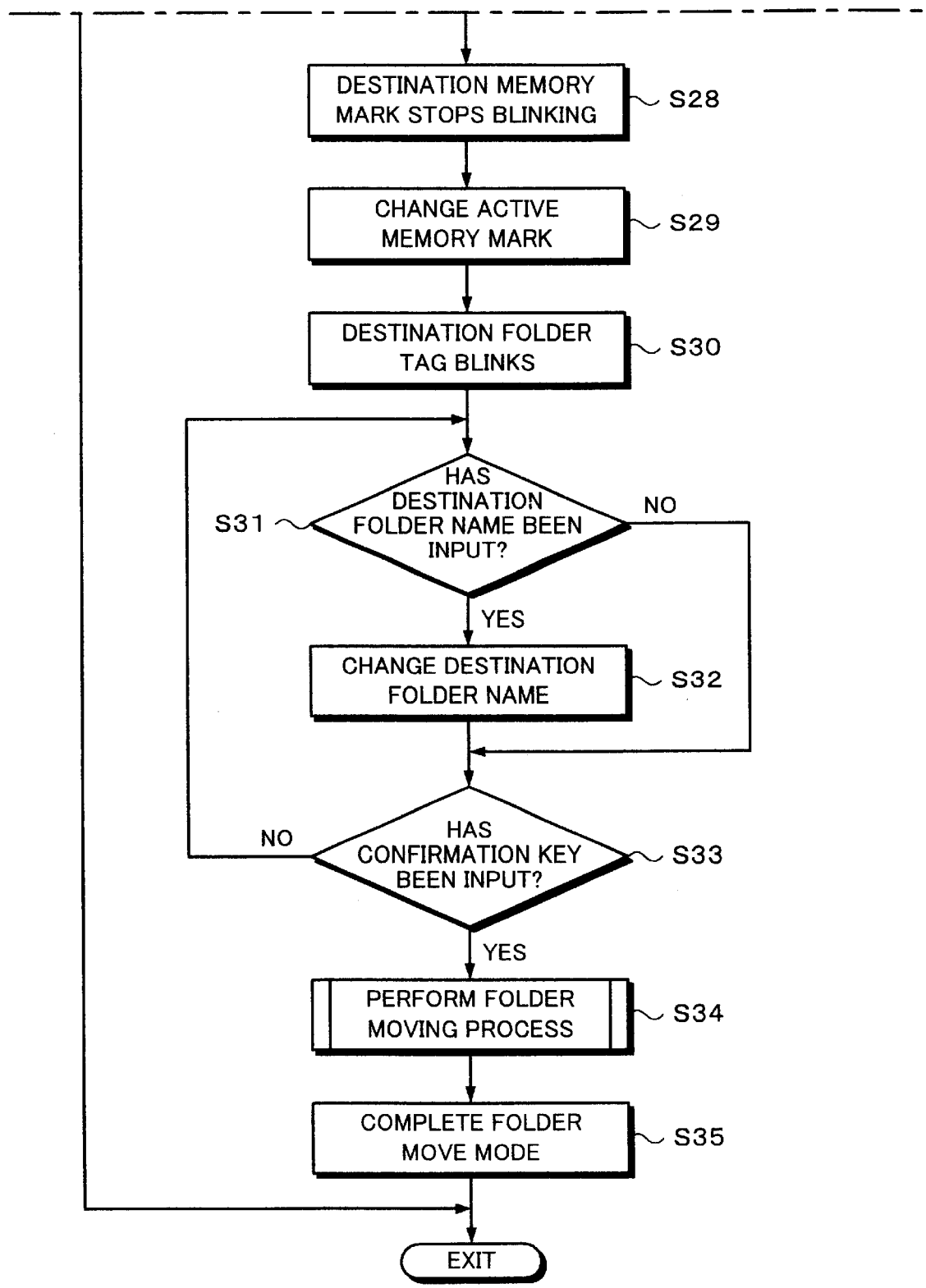
FIG. 10B is a functional flow chart for explaining a second state of the second embodiment according to the present invention.

FIG. 10 is a flow chart showing a process for moving a folder among a plurality of memories.

In FIG. 10, when a folder is moved from one memory to another memory, at step S21, it is determined whether or not the apparatus has been set to the folder move mode. With the mode switching key 52, the apparatus is set to the folder move mode. When the determined result at step S21 is No, the process is terminated. When the determined result at step S21 is Yes, the flow advances to step S22. At step S22, as shown in FIG. 11B, the mode indicator 70 that represents the folder move mode appears. Thereafter, the flow advances to step S23. At step S23, a destination memory name is initialized.

When the apparatus has been set to the folder move mode, at step S24, a destination memory mark 71A of memory marks 71A, 71B, and 71C blinks. Thereafter, the flow advances to step S25. At step S25, it is determined whether or not a destination memory name to be changed has been input.

With the operation keys 53A and 53B, the destination memory is changed. The memory mark 71A that represents the destination memory blinks. When the determined result at step S25 is Yes, the flow advances to step S26. At step S26, the destination memory name is changed corresponding to the input destination memory name.

Thereafter, the flow advances to step S27. At step S27, it is determined whether or not the destination memory has been confirmed. When the destination memory has been decided, the confirmation key 54 is pressed. When the determined result at step S27 is No, the flow returns to step S25. At step S25, the destination memory name changing process is repeated.

When the determined result at step S27 is Yes, the flow advances to step S28. At step S28, the destination memory mark 71A stops blinking. Thereafter, the flow advances to step S29. At step S29, an active memory mark 72 represents the destination memory name. Thereafter, the flow advances to step S30. At step S30, a folder mark tag 62 blinks. When the folder mark tag 62 blinks, the destination folder name can be changed. Thereafter, the flow advances to step S31. At step S31, it is determined whether or not a destination folder name to be changed has been input with the selection keys 53A and 53B.

At this point, with the selection keys 53A and 53B, the destination folder name is changed. The folder mark tag 62 that represents the folder name of the memory blinks. Thereafter, the flow advances to step S31. When the determined result at step S31 is Yes, the flow advances to step S32. At step S32, corresponding to the input destination folder name, the folder name is changed.

Thereafter, the flow advances to step S33. At step S33, it is determined whether or not the confirmation key 54 has been pressed. When the folder name has been decided, the confirmation key 54 is pressed. When the determined result at step S33 is No, the flow returns to step S31. At step S31, the destination folder name changing process is repeated.

In the loop of step S31 to step 33, the destination folder name changing process is performed. When the destination folder name has been decided, the flow advances to step S33. At step S33, it is determined whether or not the confirmation key 54 has been pressed.

When the determined result at step S33 is Yes, the flow advances to step S34. At step S34, a process for moving a folder to a designated folder is performed. Thereafter, the flow advances to step S35. At step S35, the folder move mode is completed.

At this point, when the same memory name is selected as the destination memory name and the source memory name, the order of a folder name can be changed in the same memory.

FIGS. 11A, 11B, 11C, and 11D show examples of states of an icon in the case that a folder is moved from one memory to another memory. As shown in FIGS. 11A to 11D, when a plurality of memories are used, along with a folder mark 61, indicators 71A, 71B, and 71C that represent the disposed memories and an indicator 72 that represents the current active memory are disposed. The folder mark 61 has three tags 63, 64, and 62. The tag 63 represents the total number of speech record files of the current folder. The tag 64 represents the current speech record number. The tag 62 represents the current folder name.

Figure 11A:
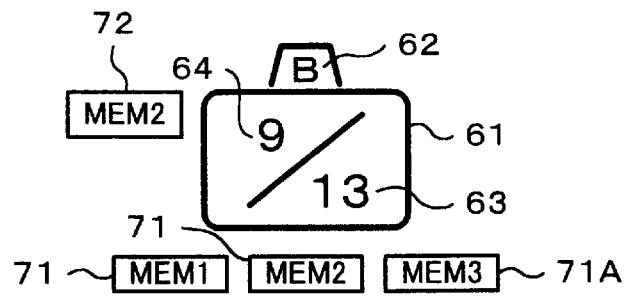
FIG. 11A is a schematic diagram showing a first state according to the second embodiment of the present invention.
Figure 11B:
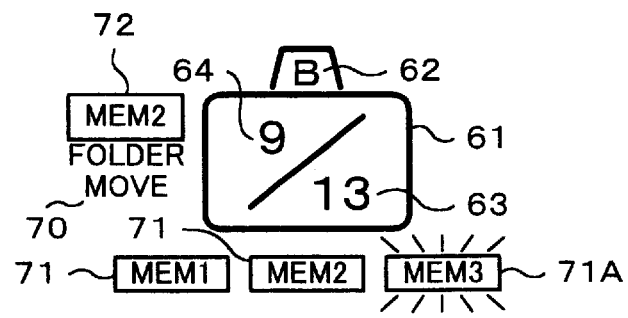
FIG. 11B is a schematic diagram showing a second state according to the second embodiment of the present invention.

As shown in FIG. 11A, it is assumed that the currently active memory is MEM2, the current folder name is B, the folder B has a total of 13 speech record files, and the current speech record number is 9. In addition, it is assumed that all speech record files of the folder B of the memory MEM2 are moved to the folder A of the memory MEM3.

When a folder is moved from one memory to another memory, the apparatus is set to the folder move mode. In the folder move mode, as shown in FIG. 11B, a destination memory mark 71A of memory marks 71A, 71B, and 71C blinks.

When the selection keys 53A and 53B are pressed, destination memory mark that blinks changes in the order of 71C, 71B, and 71A that represent MEM1, MEM2, and MEM3, respectively. In this example, since the destination folder name is MEM3, with the selection keys 53A and 53B, the destination folder name is selected so that the memory mark 71A represents MEM3.

Figure 11C:
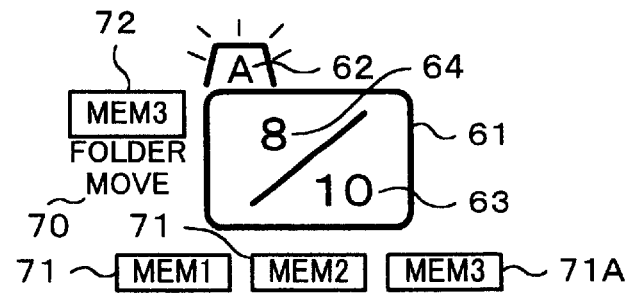
FIG. 11C is a schematic diagram showing a third state according to the second embodiment of the present invention.

After the destination memory has been selected, the confirmation key 54 is pressed. When the confirmation key 54 is pressed, as shown in FIG. 11C, the active memory indicator 72 represents MEM3. In addition, the memory mark 71A stops blinking. Thereafter, tag 62 that represents the destination folder blinks. The total number of speech record files and the current speech record number represented by the indicators 63 and 64, respectively, of the folder icon 61 are changed to those of the destination folder.

At this point, when the selection keys 53A and 53B are pressed, the position of the tag 62 changes. The destination folder name in the tag 62 changes in the order of A, B, and C. In this example, since the destination folder name is A, with the selection keys 53A and 53B, the destination folder name is selected so that the tag 62 represents A.

Figure 11D:
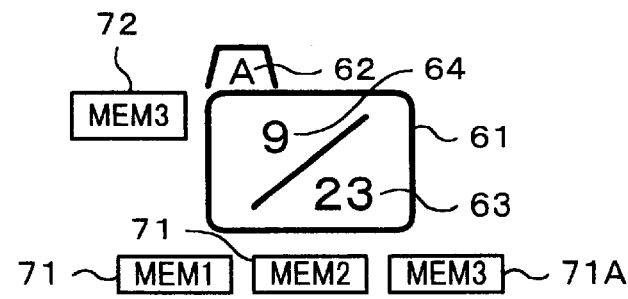
FIG. 11D is a schematic diagram showing a fourth state according to the second embodiment of the present invention.

After the destination folder name has been selected, the confirmation key 54 is pressed. When the confirmation key 54 is pressed, as shown in FIG. 11D, the active memory indicator 72 represents MEM3. In addition, the tag 62 represents the folder name A.

At this point, when the same memory name is selected as the source memory name and the destination memory name, the order of a folder can be changed in the same memory.

Figure 12B:
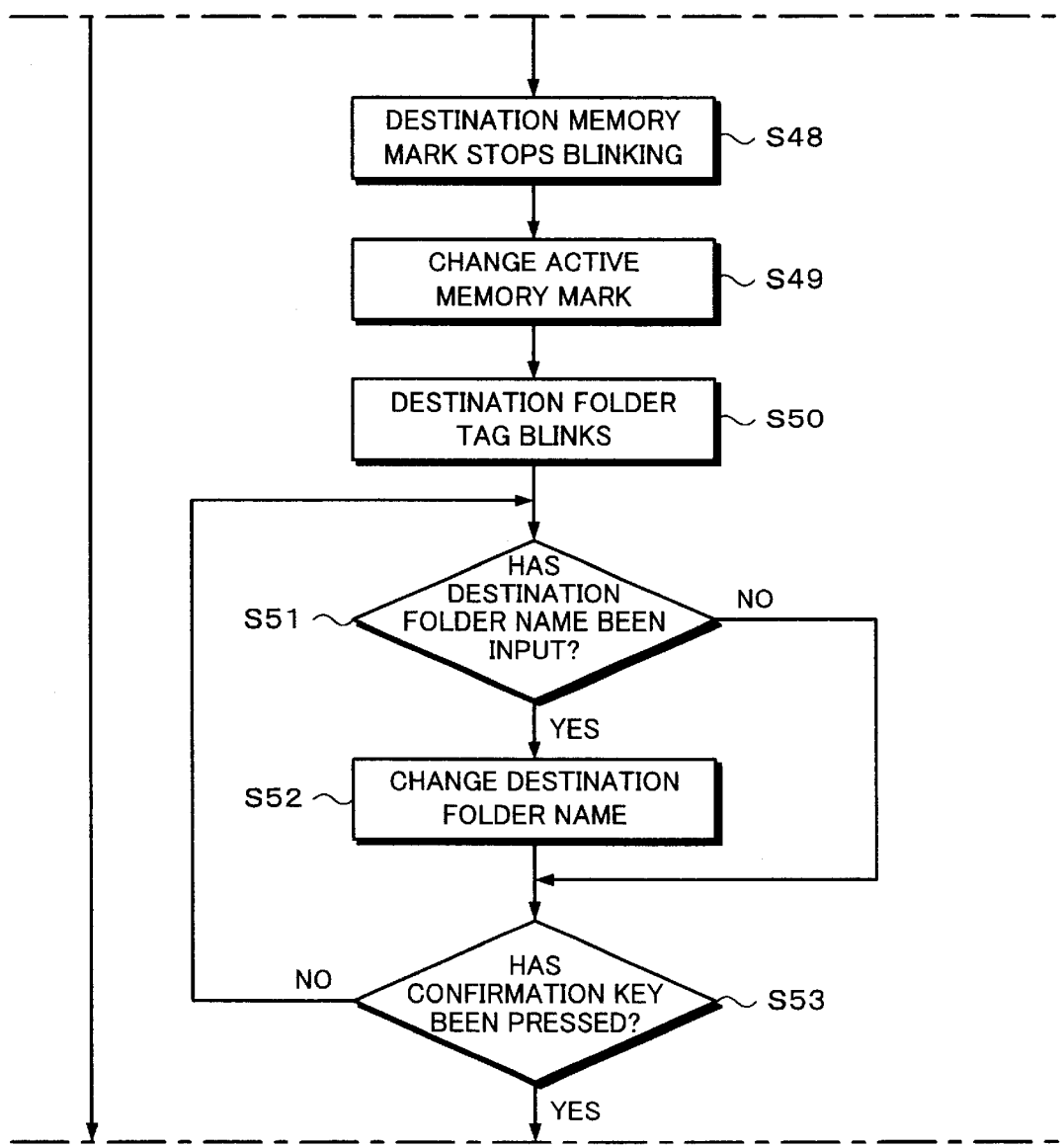
FIG. 12B is a functional flow chart for explaining the structure of a second state of the third embodiment according to the present invention.
Figure 12C:
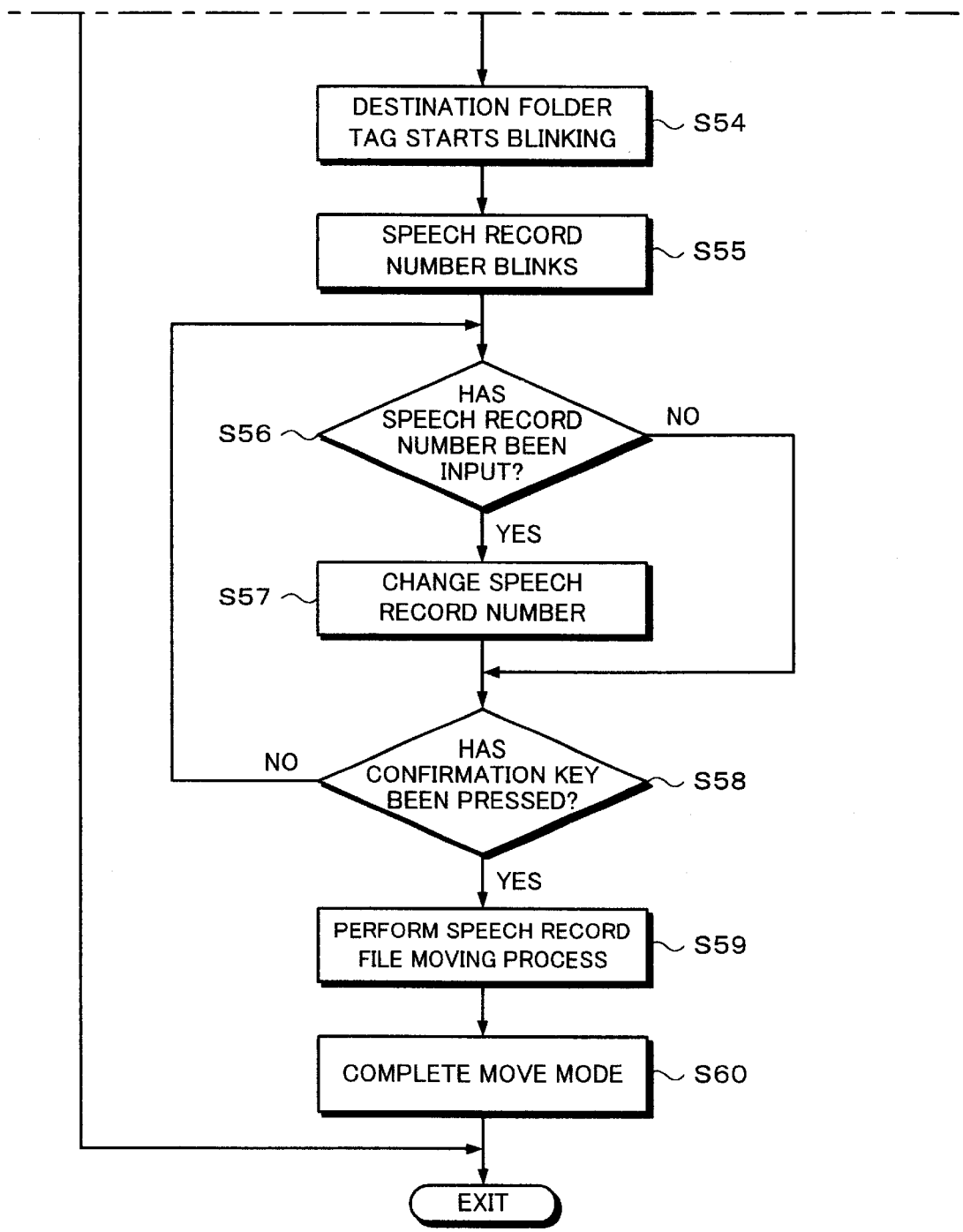
FIG. 12C is a functional flow chart for explaining the structure of a third state of the third embodiment according to the present invention.

FIG. 12 is a flow chart showing a process for moving a speech record file among a plurality of memories.

When a speech record file is moved, the apparatus is set to the move mode. In FIG. 12, at step S41, it is determined whether or not the apparatus has been set to the move mode. With the model switching key 52, the apparatus is set to the move mode. When the determined result at step S41 is No, the process is terminated. When the determined result at step S41 is Yes, the flow advances to step S42. At step S42, as shown in FIG. 13B, a mode indicator 70 that represents that the apparatus has been set to the move mode appears. Thereafter, the flow advances to step S43. At step S43, the destination memory name is initialized.

When the apparatus has been set to the move mode, the flow advances to step S44. At step S44, a destination memory mark 71B of memory marks 71A, 71B, and 71C blinks. Thereafter, the flow advances to step S45. At step S45, it is determined whether or not a destination memory name to be changed has been input.

With the selection keys 53A and 53B, the destination memory is changed. One of the memory marks 71A, 71B, and 71C blink corresponding to the input destination memory name. Thereafter, the flow advances to step S45. When the determined result at step S45 is Yes, the flow advances to step S46. At step S46, corresponding to the input destination memory name, the destination memory name is changed.

Thereafter, the flow advances to step S47. At step S47, it is determined whether the input destination memory name has been confirmed with the confirmation key 54. When the destination memory name has been decided, the confirmation key 54 is pressed. When the determined result at step S47 is No, the flow returns to step S45. At step S45, the destination memory name changing process is repeated.

When the determined result at step S47 is Yes, the flow advances to step S48. At step S48, the destination memory mark 71B stops blinking. Thereafter, the flow advances to step S49. At step S49, the active memory mark 72 represents the destination memory name. Thereafter, the flow advances to step S50. At step S50, the folder mark tag 62 blinks. When the folder mark tag 52 blinks, the destination folder name can be changed. Thereafter, the flow advances to step S51. At step S51, it is determined whether or not the destination folder name has been changed with the selection keys 53A and 53B.

At this point, with the selection keys 53A and 53B, the destination folder name can be changed. The folder mark tag 62 that represents the folder name of the memory blinks. When the determined result at step S51 is Yes, the flow advances to step S52. At step S52, the folder name is changed corresponding to the input destination folder name.

When the destination folder name has been changed, the flow advances to step S53. At step S53, it is determined whether or not the confirmation key 54 has been pressed. When the determined result at step S53 is No, the flow returns to step S51. At step S51, the destination folder name changing process is repeated.

In the loop of step S51 to step S53, the destination folder name changing process is performed. When the destination folder name has been decided, the flow advances to step S53. At step S53, it is determined whether or not the confirmation key 54 has been pressed.

After the folder name has been changed, the destination folder mark tag 62 stops blinking. Thereafter, the flow advances to step S55. At step S55, the indicator 64 that represents the speech record number of the destination folder blinks. Thereafter, the flow advances to step S56. At step S56, it is determined whether or not the speech record number to be changed in the destination folder has been input.

At this point, with the selection keys 53A and 53B, the speech record number of the destination folder is changed. The indicator 64 that represents the current speech record number of the destination folder blinks. When the determined result at step S56 is Yes, the flow advances to step S57. At step S57, the speech record number is changed corresponding to the input speech record number.

After the speech record number has been changed, the flow advances to step S58. At step S58, it is determined whether or not the confirmation key 54 has been pressed. After the speech record number has been decided, the confirmation key 54 is pressed. When a speech record number has not been decided, the confirmation key 54 is not pressed. When the determined result at step S58 is No, the flow returns to step S56. At step S56, the speech record number changing process is repeated.

In the loop of step S56 to step 58, the speech record number changing process is performed for the destination folder. After the speech record number of the destination folder has been confirmed, the flow advances to step S58. At step S58, the determined result at step S54 becomes Yes.

When the determined result at step S58 is Yes, the flow advances to step S59. At step S59, a process for moving a speech record file to a designated speech record number of a designated folder is performed. Thereafter, the flow advances to step S60. At step S60, the move mode is completed.

With the above-described process, a process for moving a speech record file from one memory to another memory can be performed.

Figure 13A:
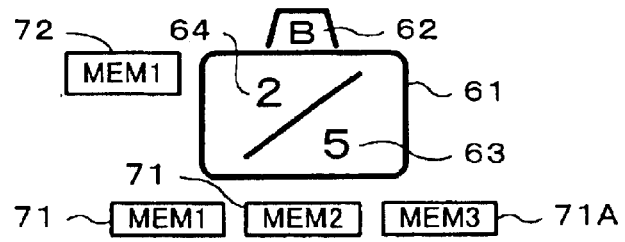
FIG. 13A is a schematic diagram showing a first state according to the third embodiment of the present invention.
Figure 13B:
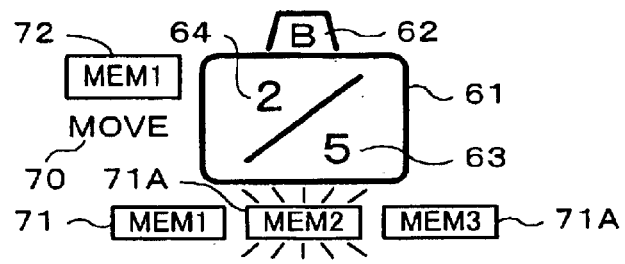
FIG. 13B is a schematic diagram showing a second state according to the third embodiment of the present invention.

FIGS. 13A, 13B, 13C, and 13D show examples of states of an icon in the case that a speech record file is moved from one memory to another memory. As shown in FIG. 13A, it is assumed that the current active memory is MEM1, the folder name is B, the folder B has a total of five speech record files, and the current speech record number is 2. In addition, it is assumed that the speech record file (speech record number 2) of the folder B of the memory MEM1 is moved to the speech record file (speech record number 3) of the folder C of the memory MEM2.

When a speech record file is moved from one memory to another memory, the apparatus is set to the move mode. In the move mode, as shown in FIG. 13B, a destination memory mark 71B of destination memory marks 71A, 71B, and 71C blinks.

When the selection keys 53A and 53B are pressed, the destination memory mark that blinks changes in the order of 71C, 71B, and 71A that represent MEM1, MEM2, and MEM3, respectively. In this example, since the destination folder name is MEM2, with the selection keys 53A and 53B, the destination folder name is selected so that the memory mark 71B represents MEM2.

Figure 13C:
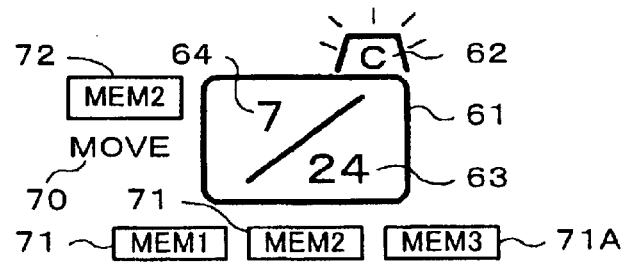
FIG. 13C is a schematic diagram showing a third state according to the third embodiment of the present invention.
Figure 13D:
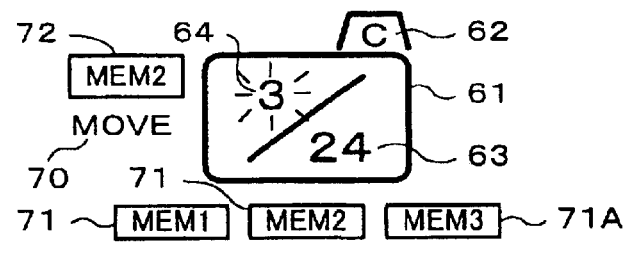
FIG. 13D is a schematic diagram showing a fourth state according to the third embodiment of the present invention.

After the destination memory has been selected, the confirmation key 54 is pressed. When the confirmation key 54 is pressed, as shown in FIG. 13C, the active memory indicator 72 represents MEM2. In addition, the memory mark 71B stops blinking. Thereafter, tag 62 that represents the destination folder blinks. The total number of speech record files and the current speech record number represented by the indicators 63 and 64, respectively, of the folder icon 61 are changed to those of the destination folder.

At this point, when the selection keys 53A and 53B are pressed, the position of the tag 62 changes. The folder name in the tag 62 changes in the order of A, B, and C. In this example, since the destination folder name is C, with the selection keys 53A and 53B, the destination folder name is selected so that the tag 62 represents C.

After the destination folder name has been selected, the confirmation key 54 is pressed. When the confirmation key 54 is pressed,.the tag 62 that represents the destination folder name C stops blinking. In addition, the indicator 64 that represents the current speech record number blinks.

With the selection keys 53A and 53B, the destination speech record number is changed. In this case, since the destination speech record number is 3, with the selection keys 53A and 53B, the speech record number is selected so that the indicator 64 represents 3.

Figure 13E:
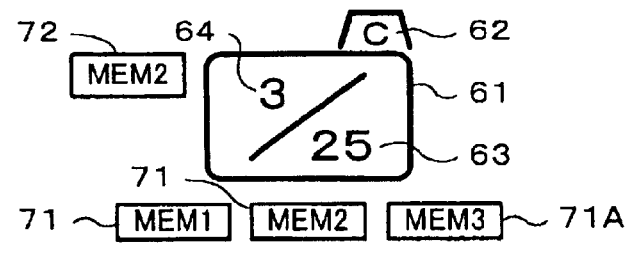
FIG. 13E is a schematic diagram showing a fifth state according to the third embodiment of the present invention.

After the destination speech record number has been selected, the confirmation key 54 is pressed. When the confirmation key 54 is pressed, as shown in FIG. 13E, the speech record file (speech record number 2) of the folder B of the memory MEM1 is moved to the speech record file (speech record number 3) of the folder C of the memory MEM2.

When the same memory name is selected as the source memory name and the destination memory name, the order of a folder in the same memory can be changed. When the destination memory and folder are the same as the source memory and folder, a speech record number can be changed in the same folder of the same memory.

In the above-described embodiment, a file of a source folder is appended to a destination folder. However, the present invention is not limited to such a process. Instead, a destination folder may be increased by one. Thus, a destination folder name may be changed corresponding to the increase of a folder. In this case, the number of files of a source folder does not change. Thus, when a file is appended, a file name does not change. Consequently, when folders are managed for individual meetings, a folder for one meeting can be prevented from containing a speech record file for another meeting. In addition, a destination folder can be overwritten with a source folder. This method is effective when an old destination folder is replaced with a source folder.

According to the present invention, a plurality of memories can be used. Alternatively, the apparatus may have a plurality of memory slots. In this case, a source memory is attached to a memory slot. A file stored in the source memory is stored to a temporary buffer. Thereafter, the source memory is substituted with a destination memory. Thereafter, the file stored in the temporary file is stored to a destination memory.

According to the present invention, the total number of speech record files and the current speech record number are represented by a folder icon. The folder icon has a tag that represents a folder name. With the folder icon, a speech record file can be visually moved from one folder to another folder or a speech record number can be changed in the same folder. With indicators for a plurality of memories and an indicator for an active memory, a folder can be visually moved from one memory to another memory or a file can be visually moved from one memory to another memory.

According to the present invention, since a speech record file can be moved from one folder to another folder, a speech record file can be changed in the same folder, a folder can be moved from one memory to another memory, and a speech record file can be moved from one memory to another memory. Thus, according to the present invention, speech record files can be edited and a desired speech record file can be easily searched.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. An editing apparatus for categorizing files stored in a record medium as a plurality of groups, managing the files with the groups, and moving a file recorded in the record medium in the same group or from one group to another group, the apparatus comprising:

operating means for designating a second group to which a first group is moved and an insertion position of a file of the second group;

displaying means for displaying a total number of files categorized as the designated group, a position number that represents a position of a designated file of the designated group, and a tag that identifies a group name from which the first group is moved and a group name of the second group to which the first group is moved; and display control means for displaying the tag identifying the group name of the second group designated by the operating means, a position number of the insertion position of the designated file in the second group, and a total number of files in the second group at a predetermined position on the displaying means.

2. An editing apparatus for categorizing files stored in a plurality of record mediums as a plurality of groups, managing the files with the groups, and moving a group recorded in a first record medium to a second record medium of the plurality of record mediums, the apparatus comprising:

operating means for designating the second record medium to which the group is moved and an insertion position of the group in the designated second record medium to which the group is moved;

displaying means for displaying a record medium name of the designated second record medium to which the group is moved, a total number of files in the group, a position number that represents a position of a designated file of the group, and a tag that represents a first group name from which the group is moved, a second group name to which the group is moved, a memory name of the designated second record medium to which the group is moved, and a memory name of the first record medium from which the group is moved; and display control means for displaying the tag in which the second record medium name designated by the operating means and the group name of the group of the second record medium, the insertion position number within the group name of the group of the second record medium, and the total number of files within the group name of the group of the second record medium are shown on a predetermined position of the displaying means.

3. An editing method for categorizing files recorded in a record medium as a plurality of groups, managing the files with the groups, and moving a file recorded in the record medium in the same group or from a first group to a second group, the method comprising the steps of:

designating a second group to which the group is moved and an insertion position of a file that is moved;

displaying a total number of files categorized as the designated second group to which the file is moved, a position number representing a position of a designated file of the files of the designated group, and a tag that identifies a name of the first group and a name of the second group; and displaying the tag that shows the designated second group name, the position number of the insertion position of the file in the second group, and the total number of files in the second group on a predetermined position of a display means.

4. An editing method for categorizing files recorded in a plurality of record mediums as a plurality of groups, managing the files with the groups, and moving a group from a first record medium to a second record medium, comprising the steps of:

designating the second record medium and an insertion position of the group in the second record medium;

displaying a total number of files in the group, a position number representing a position of a designated file of the files of the group, and a tag identifying a first group name from which the group is moved, a second group name to which the group is moved, a memory name of the first record medium, and a memory name of the second record medium; and displaying the tag in which the second record medium name and the group name of the group of the second record medium, the insertion position number within the group name of the group of the second record medium, and the total number of files within the group name of the group of the second record medium are shown on a predetermined position of a displaying means.

* * * * *